(12) United States Patent
Merovitz et al.

(10) Patent No.: US 12,162,399 B2
(45) Date of Patent: Dec. 10, 2024

(54) VEHICLE DOOR LIGHT ASSEMBLY

(71) Applicant: YourTruckShop Inc., Laval (CA)

(72) Inventors: David Merovitz, Cote Saint Luc (CA); Eric Merovitz, Laval (CA); Daniel Hsiao Yuan Jeong, Temecula, CA (US); Mitchell Robert Magonet, Cote Saint Luc (CA)

(73) Assignee: YourTruckShop Inc., Laval (CA)

( * ) Notice: Subject to any disclaimer, the term of this patent is extended or adjusted under 35 U.S.C. 154(b) by 63 days.

(21) Appl. No.: 18/336,231

(22) Filed: Jun. 16, 2023

(65) Prior Publication Data

US 2023/0406197 A1 Dec. 21, 2023
US 2024/0294113 A9 Sep. 5, 2024

Related U.S. Application Data

(60) Provisional application No. 63/352,765, filed on Jun. 16, 2022.

(51) Int. Cl.
*B60Q 1/24* (2006.01)
*F21V 11/16* (2006.01)
*F21V 23/06* (2006.01)
*F21W 102/40* (2018.01)
*F21Y 113/10* (2016.01)
*F21Y 115/10* (2016.01)

(52) U.S. Cl.
CPC .............. *B60Q 1/247* (2022.05); *F21V 11/16* (2013.01); *F21V 23/06* (2013.01); *B60Q 2400/20* (2013.01); *F21W 2102/40* (2018.01); *F21Y 2113/10* (2016.08); *F21Y 2115/10* (2016.08)

(58) Field of Classification Search
CPC .......... B60Q 1/247; F21V 11/16; F21V 23/06
See application file for complete search history.

(56) References Cited

U.S. PATENT DOCUMENTS

| | | | | |
|---|---|---|---|---|
| 10,946,815 | B1 * | 3/2021 | Salter | F21S 43/19 |
| 11,428,383 | B1 * | 8/2022 | Zheng | F21V 5/02 |
| 11,518,310 | B2 * | 12/2022 | Schmierer | B60R 1/12 |
| 2023/0278500 | A1 * | 9/2023 | Parish | B60Q 1/307 |
| | | | | 280/164.1 |
| 2023/0331149 | A1 * | 10/2023 | Vander Sluis | B60Q 3/60 |

* cited by examiner

*Primary Examiner* — Christopher E Dunay
(74) *Attorney, Agent, or Firm* — Blank Rome LLP

(57) ABSTRACT

A vehicle door light assembly includes a base including a cavity and one or more bulb connectors positioned within the cavity; a connector for connecting the one or more bulb connectors to a power source; a lens assembly releasably connected to the base, wherein the lens assembly comprises: a lens, a light source adapted to emit light through the lens to the exterior of the light assembly, and a projector adapted to project an image to the exterior of the light assembly when the door is in an open position; and a bulb connector releasably connected to the one or more bulb connectors to supply power to the lens assembly.

19 Claims, 8 Drawing Sheets

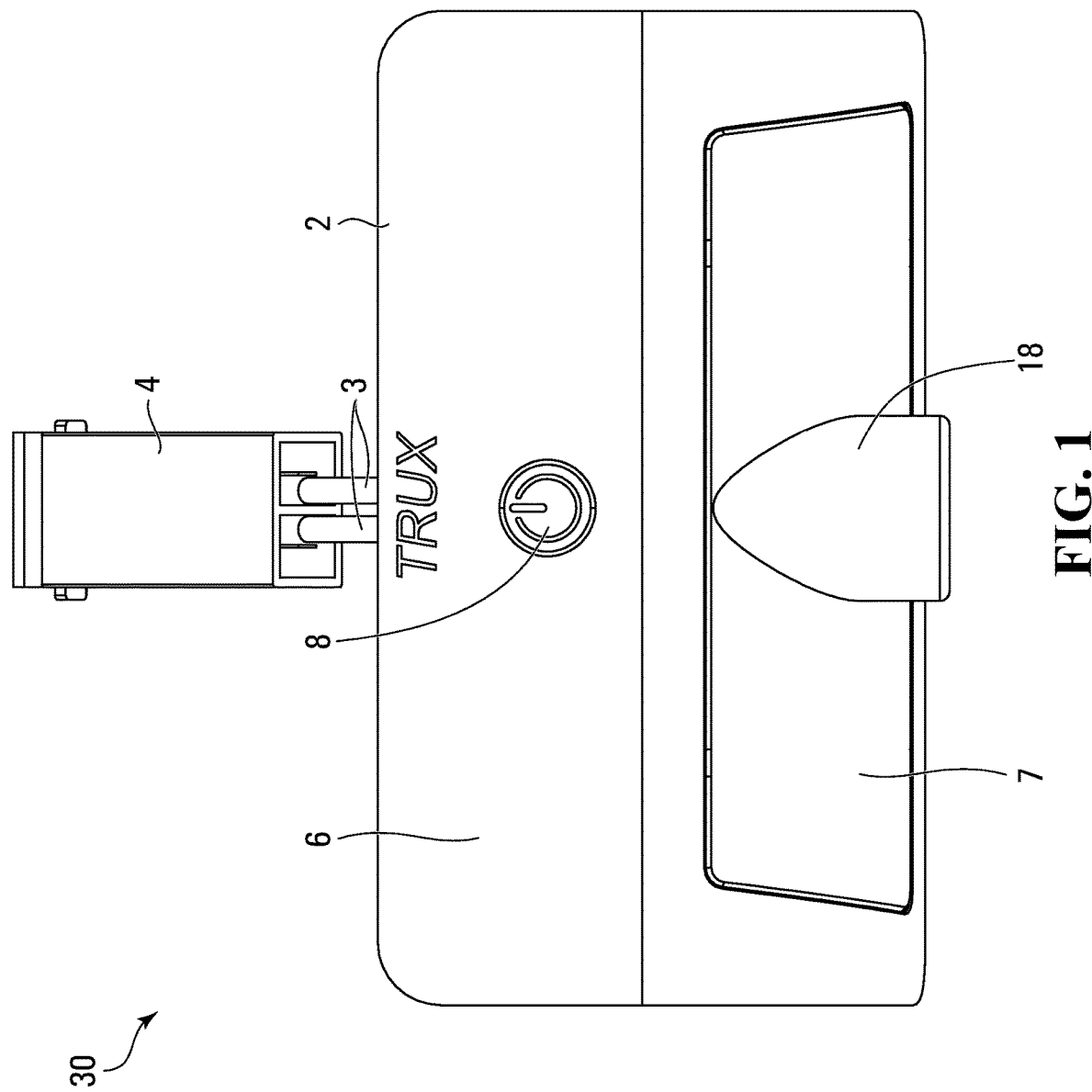

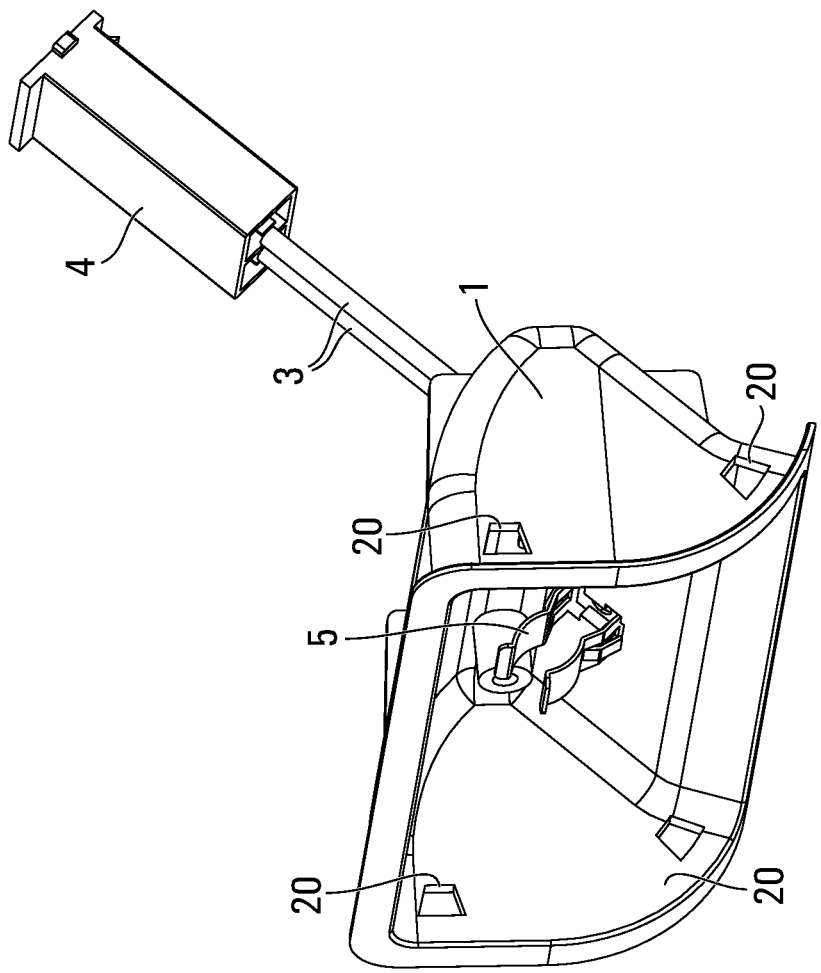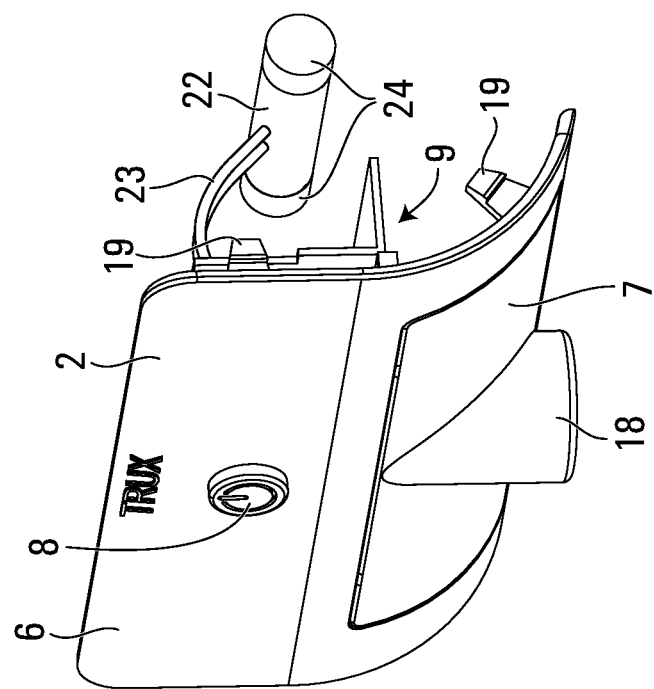
FIG. 7

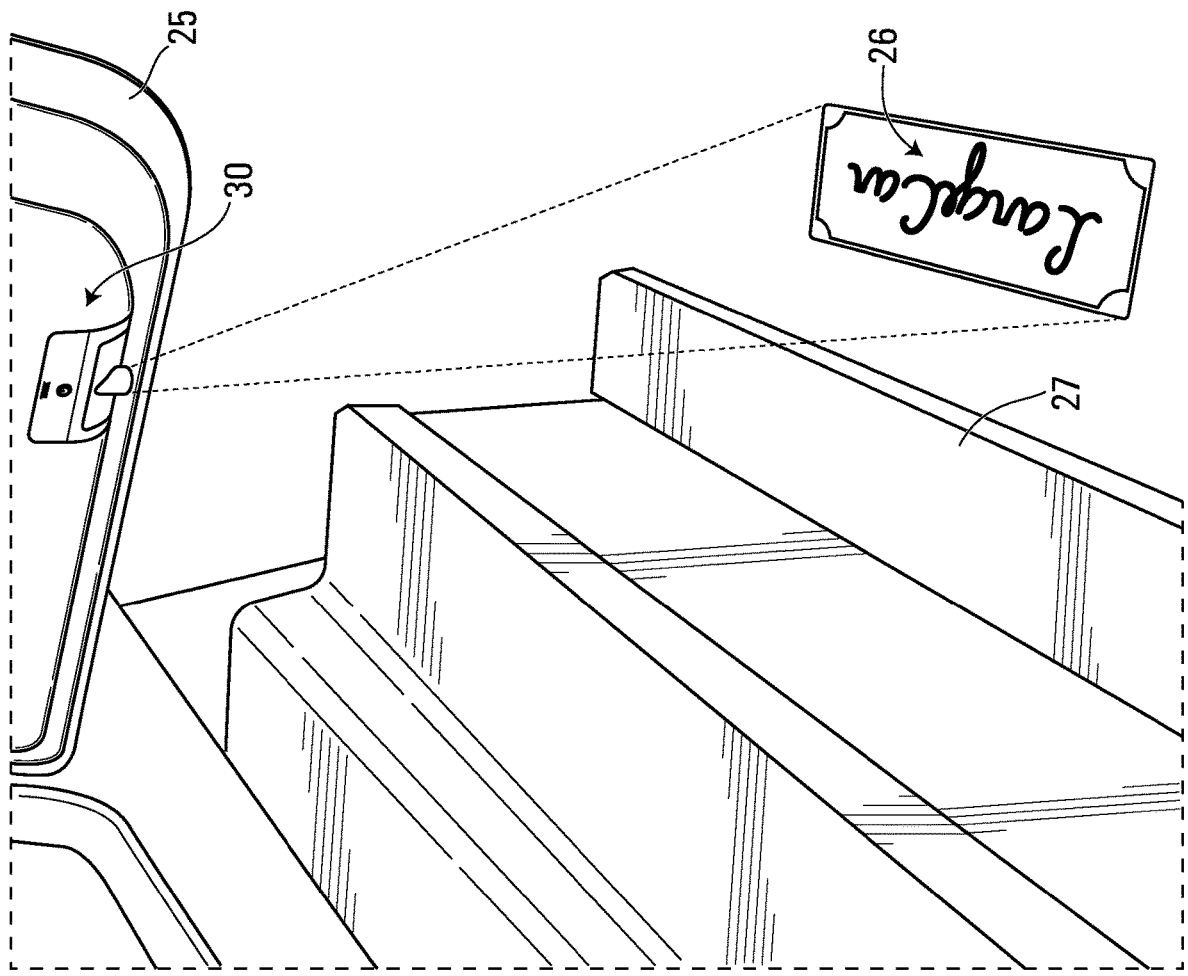

VEHICLE DOOR LIGHT ASSEMBLY

CROSS-REFERENCE TO RELATED APPLICATIONS

This application claims the benefit of U.S. Provisional Patent Application No. 63/352,765 filed Jun. 16, 2022, the contents of which are incorporated herein by reference in its entirety.

TECHNICAL FIELD

The present disclosure relates to a light assembly for the door of a vehicle. More specifically, the present disclosure relates to door light assembly that includes a projector which projects light onto the ground or other surface beneath the vehicle door and may also include one or more lenses that selectively emit light in one or more colours and/or in a flashing mode.

BACKGROUND

Vehicles have door lights which emit light downward when the door of the vehicle is opened to illuminate the ground or a surface beneath the door of the vehicle. These door lights typically include a base, a light bulb (for example a halogen bulb) and lens covering and are typically designed to emit light in a single colour.

Vehicle door projector lights that project light, often in the form of an image, including but not limited to text, a logo, a picture or a pattern, onto the ground or a surface beneath the vehicle door when the door is opened are also known. However, these door projector lights are typically aftermarket products that are attached to the door of the vehicle (for example by an adhesive, screws or by cutting or drilling a hole in the door) and require separate wiring or an alternative power source (for example a battery) to provide power to the projector.

SUMMARY OF THE INVENTION

The following summary is provided to introduce the reader to the more detailed discussion to follow. The summary is not intended to limit or define the claims.

According to one broad aspect, a light assembly for a vehicle door comprising a base comprising a base power connector; a power source connector for connecting the base power connector to a power source; a lens assembly releasably connected to the base wherein the lens assembly comprises at least one lens; at least one lens light source to emit light through the at least one lens to the exterior of the light assembly; a projector to project light on a surface under the vehicle door when the vehicle door is in an open position; and a lens assembly power connector adapted to releasably connect to the base power connector.

In some examples, the light assembly for a vehicle door may include the base being adapted to be inserted in a cavity in the vehicle door provided for the original door light assembly installed by the vehicle manufacture; and the power source connector being adapted to connect to an electrical connector installed by the vehicle manufacturer to power the original door light assembly. The base power connector may also comprise a plurality clips; and the lens assembly power connector may also comprise a bulb connector adapted to be releasably inserted in the plurality of clips.

In other examples, the lens assembly may include a first lens and a second lens; and a first lens light source and a second lens light source wherein the first lens light source is adapted to emit light through the first lens to the exterior of the light assembly; and the second lens light source is adapted to emit light through the second lens to the exterior of the light assembly. The first lens light source may comprise a first set of at least one LED; and the second lens light source may comprise a second set of at least one LED. The second set of at least one LED may be adapted to emit light of different colours and the light assembly may further include a controller to change the colour of the light emitted from the second set of at least one LED. The first set of at least one at least one LED may also include a continuously mode wherein light is continuously emitted and a flashing mode wherein light is intermittently emitted and the light assembly may further include a controller to change the first set of at least one LED from the continuously mode to the flashing mode.

In further examples, the projector may include a projector lens; a projector light source for emitting light through the projector lens and onto the surface under the door when the door is open; an image filter through which light emitted from the projector light source partially transmits through thereby projecting an image on the surface under the vehicle door. The image filter may be rotatable relative to the lens assembly such that the orientation of the image on the surface under the vehicle door can be changed. The lens assembly may also include a projector recess and the projector may further include a projector holder wherein the projector holder is at least partially inserted within the projector recess; the projector lens is at least partially inserted within the projector holder; the projector holder and projector recess cooperate to maintain the projector lens at an orientation relative to the lens assembly; and the projector holder prevents interference of at least a portion of the light emitted from the at least one lens light source with the light emitted from the projector lens.

According to another broad aspect, a lens assembly releasably connectable to a base of a light assembly for a vehicle door comprising at least one lens, at least one lens light source to emit light through the at least one lens to the exterior of the light assembly; a projector to project light on a surface under the vehicle door when the vehicle door is in an open position; and a lens assembly power connector adapted to releasably connect to a base power connector contained in the base.

In some examples, the base power connector may comprise a plurality clips; and the lens assembly power connector comprises a blub bulb connector adapted to be releasably inserted in the plurality of clips.

In other examples, the lens assembly may include a first lens and a second lens; and a first lens light source and a second lens light source wherein the first lens light source is adapted to emit light through the first lens to the exterior of the light assembly; and the second lens light source is adapted to emit light through the second lens to the exterior of the light assembly. The first lens light source may comprise a first set of at least one LED; and the second lens light source may comprise a second set of at least one LED. The second set of at least one LED may be adapted to emit light of different colours and the light assembly may further include a controller to change the colour of the light emitted from the second set of at least one LED. The first set of at least one at least one LED may also include a continuously mode wherein light is continuously emitted and a flashing mode wherein light is intermittently emitted and the light assembly may further include a controller to change the first set of at least one LED from the continuously mode to the flashing mode.

In further examples, the projector may include a projector lens; a projector light source for emitting light through the projector lens and onto the surface under the door when the door is open; an image filter through which light emitted from the projector light source partially transmits through thereby projecting an image on the surface under the vehicle door. The image filter may be rotatable relative to the lens assembly such that the orientation of the image on the surface under the vehicle door can be changed. The lens assembly may also include a projector recess and the projector may further include a projector holder wherein the projector holder is at least partially inserted within the projector recess; the projector lens is at least partially inserted within the projector holder; the projector holder and projector recess cooperate to maintain the projector lens at an orientation relative to the lens assembly; and the projector holder prevents interference of at least a portion of the light emitted from the at least one lens light source with the light emitted from the projector lens.

BRIEF DESCRIPTION OF THE DRAWINGS

FIG. 1 is a front elevation view of a door light assembly.

FIG. 7 is a partially exploded side perspective view of the door light assembly of FIG. 1.

FIG. 9 is an image of a truck door with the door light assembly of FIG. 1 installed wherein the door is in a secure open position and an image with the words "Large Car" is displayed on the surface below the door beside the steps on the side of the truck.

The drawings illustrate examples of aspects of the invention. Other features and advantages of the present invention will become apparent from the following description of the invention, and/or from the combination of one or more of the figures and the textual description herein, or from portions thereof.

DETAILED DESCRIPTION

Figure 3:
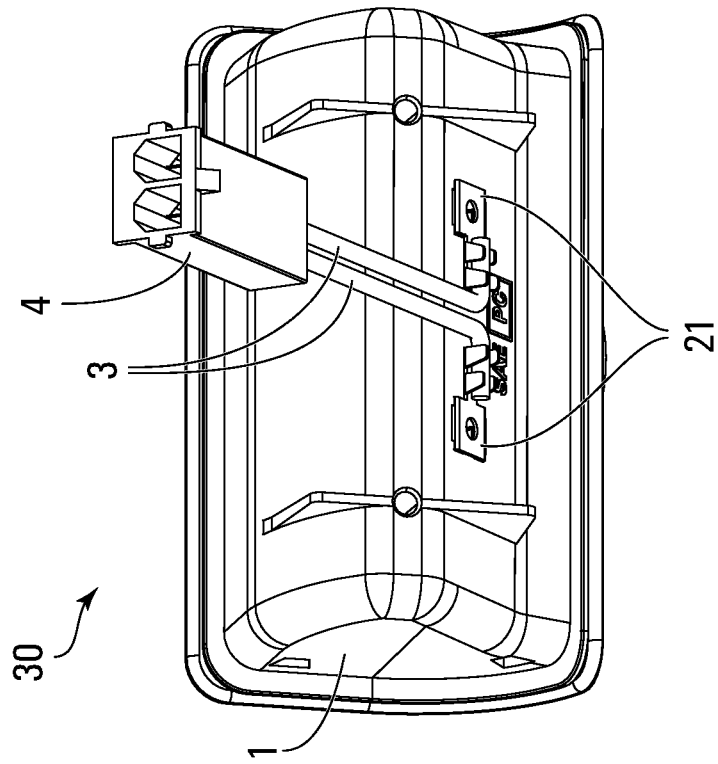
FIG. 3 is a back perspective view of the door light assembly of FIG. 1.
Figure 2:
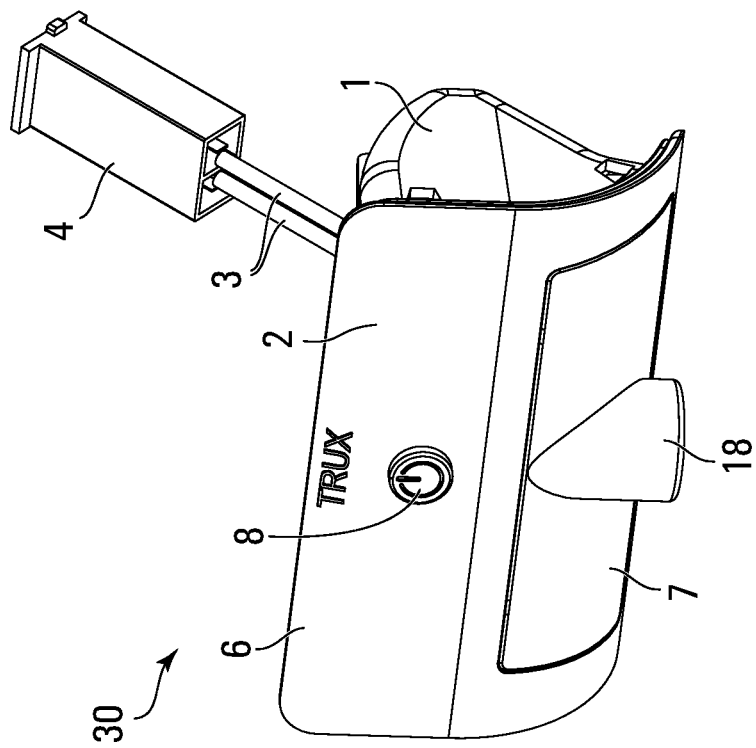
FIG. 2 is a front perspective view of the door light assembly of FIG. 1.

As shown in FIG. 1 to FIG. 3, a door light assembly 30 is provided having a base 1 and a lens assembly 2. Base 1 may be identical or similar in shape and design to the base of the original door light assembly installed by the vehicle manufacturer such that it can fit within a cavity in the door provided for the original door light assembly without requiring modifications to the door or the base. As shown in FIG. 2 to FIG. 8, base 1 includes a pair of wires 3 extending from the back thereof having a power source connector 4 on the opposite end. Power source connector 4 may be designed to connect to an electrical connector of the type installed by the vehicle manufacturer to power the original door light assembly. Accordingly, once the original door light assembly is removed and detached, the door light assembly can be plugged into the existing electrical wiring system in the vehicle door.

As shown in FIG. 3 to FIG. 8, the pair of wires 3 are electrically connected to a base power connector comprising a pair of bulb clips 5 in the interior of base 1 by means of electrical connectors 21 on the exterior of base 1. As such, power supplied to the power source connector 4 is transferred to bulb clips 5. Bulb clips 5 may be identical or similar in shape and design to clips contained in the original door light assembly installed by the vehicle manufacturer.

Referring back to FIG. 1 to FIG. 8, lens assembly 2 may include two lens components, namely a first lens 6 and a second lens 7 designed to be positioned in a space provided in the lower portion of first lens 6. The first lens 6 and second lens 7 may be made of any suitable transparent or translucent material (for example plastic or glass) such that at least some light is permitted to pass through the first lens 6 and the second lens 7.

Figure 4:
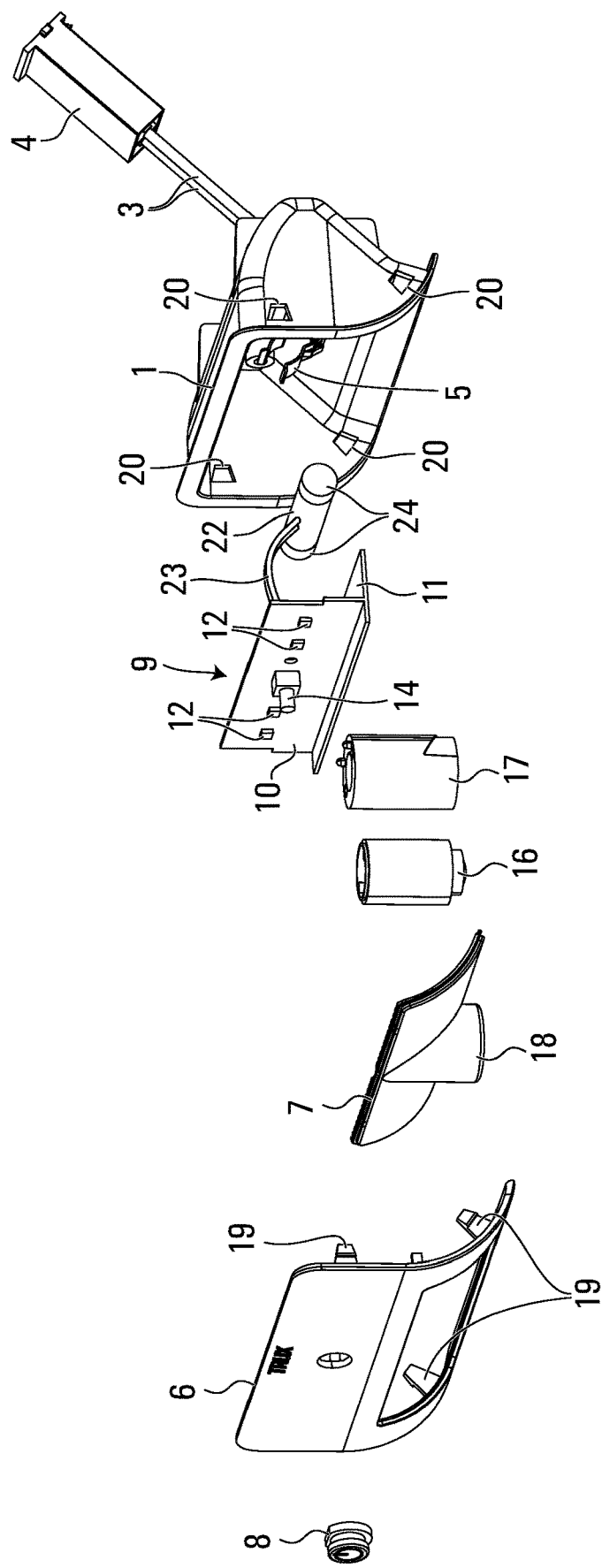
FIG. 4 is an exploded side perspective view of the door light assembly of FIG. 1.
Figure 5:
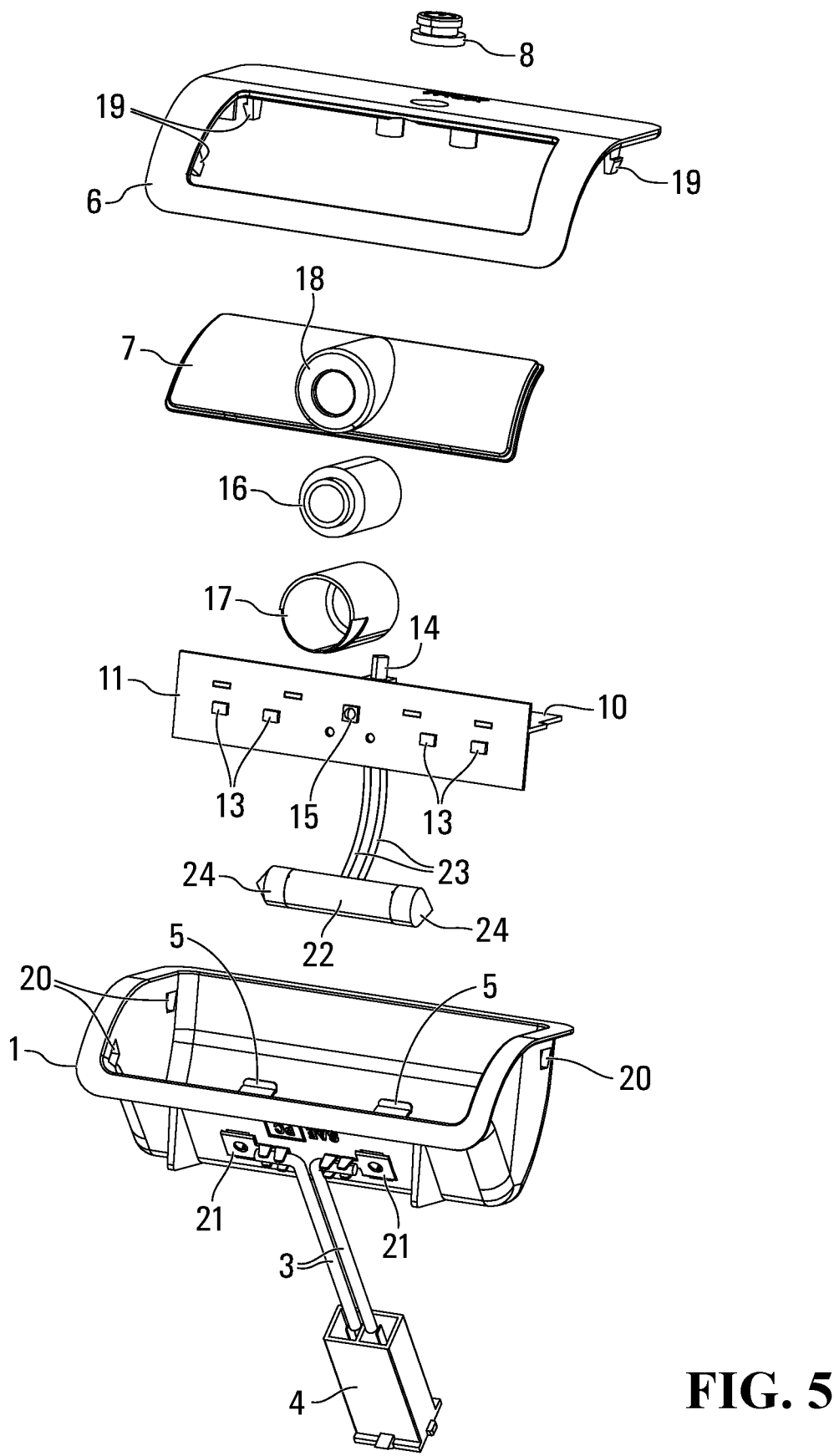
FIG. 5 is an exploded bottom perspective view of the door light assembly of FIG. 1.
Figure 6:
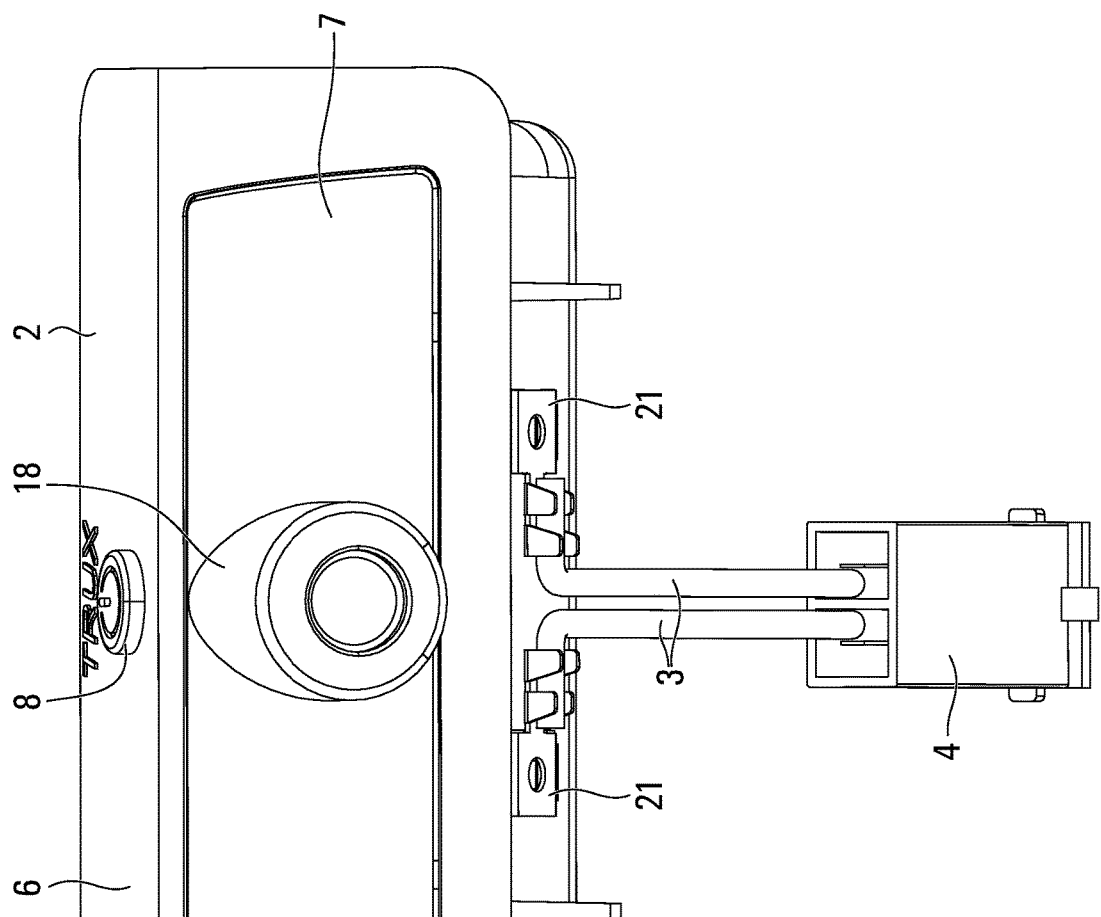
FIG. 6 is a bottom view of the door light assembly of FIG. 1.

As illustrated in FIG. 4 and FIG. 5, lens assembly 2 may include an LED board assembly 9 comprising a vertical LED board 10 and a horizontal LED board 11. Vertical LED board 10 has a row of LEDs 12 positioned on the front surface to emit light through first lens 6. Horizontal LED board 11 includes a row of LEDs 13 positioned on bottom surface to emit light through second lens 7. In the embodiment shown in FIG. 4 and FIG. 5, vertical LED board 10 has four LEDs 12 and horizontal LED board 11 has four LEDs 13. However, it would be understood that any number and/or configurations of LEDs may be used. When the lens assembly 2 is assembled, the LED board assembly 9 is secured to the lens assembly 2 by an adhesive, screw or other suitable manner.

Vertical LED board 10 also includes a switch 14 on the front surface thereof that extends outward towards first lens 6. When lens assembly 2 is assembled, switch 14 engages with the back surface of a button 8 provided in the first lens 6. In this arrangement, switch 14 is activated by pushing button 8 which triggers different functionality of the lens assembly 2 as discussed in greater detail below.

As shown in FIG. 5, the horizontal LED board 11 includes a projector LED 15 positioned in the middle of the bottom surface thereof. The projector LED 15 is designed to emit light downward through a projector lens 16. Projector lens 16 may be designed to project light onto the ground or other surface beneath the vehicle door when light is emitted from projector LED 15. The light projected onto the ground or other surface may take the form of an image, including but not limited to text, a logo, a picture or a pattern. The image may be generated by the light emitted from projector LED 15 passing through an image filter. The image filter may comprise a film positioned within or on the surface of projector lens 16, the image being etched in the surface of projector lens 16 or other suitable means.

Projector lens 16 is positioned within projector holder 17 which is held in a projector recess 18 in second lens 7. Projector holder 17 may be designed to ensure and maintain the alignment of the projector lens 16 relative to projector LED 15 to allow for light to pass through projector lens 16 and project the image on the ground or other surface under the vehicle door. The projector lens 16 and projector holder 17 may also be designed to maintain the axis of the projector lens 16 substantially vertical in orientation when the light assembly 30 is installed in the car door.

Projector holder 17 may also be designed to prevent interference of the light emitted from LEDs 13 with the light emitted from projector lens 16 which may result in a fading or blurring of the image projected onto the surface beneath the vehicle door.

The optical specifications of the projector lens 16 are selected to present a clear an image based upon the distance between the door light assembly 30 when installed in the vehicle door and the ground or other surface beneath the vehicle door when the door is opened. The image can be 1-2 square feet in dimension.

In addition, the projector lens 16 and projector holder 17 may be designed such that a horizontal longitudinal axis of the image is angled relative to the horizontal axis of the door at an angle equal to the angle between the door and the side of the vehicle when the door is in a secure open position. As shown in FIG. 9, this arrangement results in the horizontal longitudinal axis of the light projected on the ground or other surface beneath the vehicle door, for example the "Large Car" logo 26 shown in FIG. 9, being generally parallel to the side of the vehicle when a door 25 in which the light assembly 30 is installed is in the secure open position, thereby avoiding steps 27 or other obstructions on the side of the vehicle interfering with the projection of the image onto the surface beneath the vehicle door. By way of example, if the door 25 is at an angle of 70 degrees from the side of the vehicle when the door is in the secure open position, the projector lens 16 and the projector holder 17 will be designed to project an image with a horizontal longitudinal axis at an angle of 70 degrees relative to the axis of the vehicle door.

Alternatively, the image filter may be designed to be rotated within the door light assembly 30. In this embodiment, the orientation of the image projected on the ground or other surface beneath the vehicle door can be adjusted as a result of the rotation of the image filter providing the ability for the door light assembly to be used in vehicles where angle of the door in the secure open position varies and/or permits the user to adjust the orientation of image projected on the ground or other surface beneath the vehicle door to a desired orientation. This may be accomplished by the image filter being connected to the projector lens 16 and the projector lens 16 being rotatable within the projector holder 17 such that rotation of the projector lens 16 within the projector holder 17 results in a change of the orientation of the image projected on the ground or other surface relative to the lens assembly 2. Projector lens 16 may include a portion thereof which extends beyond the bottom of projector holder 17 to facilitate the rotation thereof. Alternatively, the image filter may be connected to the projector holder 17 and the projector holder 17 being rotatable within the projector recess 18 in second lens 7 such that rotation of the projector holder 17 within the projector recess 18 results in a change of the orientation of the image on the ground or other surface relative to the lens assembly 2. Projector holder 17 may include a portion thereof which extends beyond the bottom of projector recess 18 to facilitate the rotation thereof. In a further alternative, the image filter may be connected to an image rotation device which permits the image filter to be rotated relative to projector lens 16 such that rotation of the image rotation device results in a change of the orientation of the image on the ground or other surface relative to the lens assembly 2.

Figure 8:
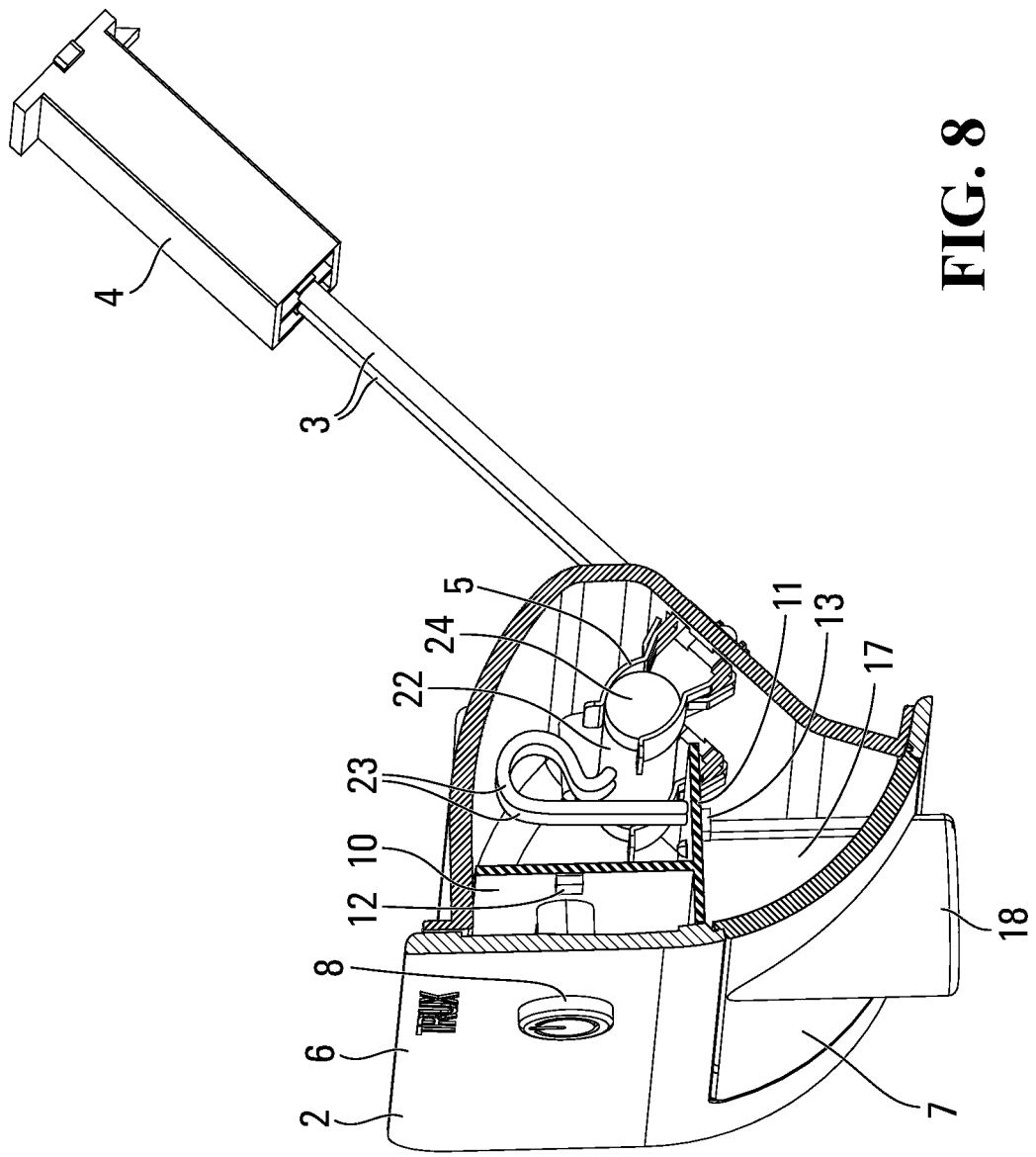
FIG. 8 is a cut-away side perspective view of the door light assembly of FIG. 1.

As shown in FIG. 4, FIG. 5 and FIG. 7, a lens assembly power connector comprises a bulb connector 22 is connected to the LED board assembly 9 by a second set of wires 23. Bulb connector 22 may be designed to have a shape identical or similar to a light bulb used in the door light assemblies installed by the vehicle manufacturer (for example a halogen bulb). In the embodiment shown, the bulb connector 22 has two metal connectors 24 positioned on opposite ends with a sealed circuit board (not shown) positioned therebetween providing an electric connection between the metal connectors and the wires 23. As shown in FIG. 8, power is provided to the LED board assembly 9 by inserting bulb connector 22 into bulb clips 5 of base 1 such that the two metal connectors 24 electrically engage bulb clips 5.

Alternatively, as a result of the design of the bulb connector 22, the lens and light bulb of the original door light assembly can be removed and bulb connector 22 can be inserted into the bulb clips of the original door light assembly installed by the vehicle manufacturer. Accordingly, lens assembly 2 may be used with the base of an existing door light assembly without removing the entirety thereof and installing base 1 in the door of the vehicle. In addition, lens assembly 2 can be easily removed and replaced with an alternative lens assembly designed to project a different image from projector lens 16.

Once the door light assembly 30 (or lens assembly 2) is installed, when the door of the vehicle is opened, power is supplied to LED board assembly 9 such that LEDs 12 and 13 may illuminate first lens 6 and second lens 7 respectively and projector LED 15 emits light through projector 16 which in turn projects an image on the surface beneath the door vehicle. A variety of configurations of first lens 6, second lens 7 and LEDs 12 and 13 can be used to provide different functionalities of lens assembly 2. By way of example, first lens 6 may be red in colour and LEDs 12 may emit white or red light so first lens 6 appears red in colour when the vehicle door is opened. LEDs 12 may also be configured to have a flash mode wherein LEDs 12 emit light intermittently to provide a flashing or strobing effect in first lens 6. The flash mode of LEDs 12 may be selectively activated by pushing button 8.

Second lens 7 may be clear or colourless and LEDs 13 may be multi-colour LEDs. In this arrangement, the colour of the light emitted through second lens 7 may be selected from one of the multi-colour options of the multi-colour LEDS. The colour of LEDs can be selectively changed by pressing and holding button 8 for a specified period (for example two seconds). As such, selectively changing of the colour of the LEDs 13 can be distinguished from the other functionality (for example selectively changing the LEDs 12 to flashing or strobing mode discussed above). Once a colour has been selected, the second lens 7 will be illuminated in that colour each time the vehicle door is opened.

Lens assembly 2 may be connected to base 1 via a snap connection. In particular, as shown in FIG. 4 and FIG. 5, first lens 6 has tabs 19 extending from the back thereof. Tabs 19 are designed to snap into holes 20 in the side of base 1 to maintain the lens assembly 2 in base 1. Lens assembly 2 can be removed from base 1 by inserting the flat tip of a screwdriver or the like between the lens assembly 2 and the base 1 and applying a force to separate the two. The force will cause tabs 19 to disengage from holes 20 thereby allowing lens assembly 2 to be removed from base 1. As a result, lens assembly 2 can easily be inserted and removed from base 1. As such, a number of lens assemblies with different projector images can be used with a single base and can be easily interchanged.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiments disclosed, but that the invention will include all embodiments falling within the scope of the appended claims and their equivalents.

What is claimed is:

1. A light assembly for a vehicle door comprising:
   a base comprising a base power connector;
   a power source connector for connecting the base power connector to a power source;
   a lens assembly releasably connected to the base wherein the lens assembly comprises at least one lens;
      at least one lens light source to emit light through the at least one lens to the exterior of the light assembly;
      a projector to project light on a surface under the vehicle door when the vehicle door is in an open position; and
      a lens assembly power connector adapted to releasably connect to the base power connector.

2. The light assembly of claim 1 wherein
   the base is adapted to be inserted in a cavity in the vehicle door provided for the original door light assembly installed by the vehicle manufacture; and
   the power source connector is adapted to connect to an electrical connector installed by the vehicle manufacturer to power the original door light assembly.

3. The light assembly of claim 1 wherein
   the base power connector comprises a plurality clips; and
   the lens assembly power connector comprises a bulb connector adapted to be releasably inserted in the plurality of clips.

4. The light assembly of claim 1 wherein
   the at least one lens of the lens assembly comprises a first lens and a second lens; and
   the at least one lens light source of the lens assembly comprises a first lens light source and a second lens light source wherein
   the first lens light source is adapted to emit light through the first lens to the exterior of the light assembly; and
   the second lens light source is adapted to emit light through the second lens to the exterior of the light assembly.

5. The light assembly of claim 4 wherein
   the first lens light source comprised a first set of at least one LED; and
   the second lens light source comprises a second set of at least one LED.

6. The light assembly of claim 5 wherein the second set of at least one LED can emit light of different colours and the light assembly further comprises a controller to change the colour of the light emitted from the second set of at least one LED.

7. The light assembly of claim 6 wherein the first set of at least one at least one LED comprises
   a continuously mode wherein light is continuously emitted and
   a flashing mode wherein light is intermittently emitted and
   the light assembly further comprises a controller to change the first set of at least one LED from the continuously mode to the flashing mode.

8. The light assembly of claim 1 wherein the projector comprises:
   a projector lens;
   a projector light source for emitting light through the projector lens and onto the surface under the door when the door is open; and
   an image filter through which light emitted from the projector light source partially transmits through thereby projecting an image on the surface under the vehicle door.

9. The light assembly of claim 8 wherein the image filter is rotatable relative to the lens assembly such that the orientation of the image on the surface under the vehicle door can be changed.

10. The light assembly of claim 8 wherein
    the lens assembly further comprises a projector recess;
    the projector further comprises a projector holder;
    wherein
    the projector holder is at least partially inserted within the projector recess;
    the projector lens is at least partially inserted within the projector holder;
    the projector holder and projector recess cooperate to maintain the projector lens at an orientation relative to the lens assembly; and
    the projector holder prevents interference of at least a portion of the light emitted from the at least one lens light source with the light emitted from the projector lens.

11. A lens assembly releasably connectable to a base of a light assembly for a vehicle door comprising:
    at least one lens,
    at least one lens light source to emit light through the at least one lens to the exterior of the light assembly;
    a projector to project light on a surface under the vehicle door when the vehicle door is in an open position; and
    a lens assembly power connector adapted to releasably connect to a base power connector contained in the base.

12. The lens assembly of claim 11 wherein
    the base power connector comprises a plurality clips; and
    the lens assembly power connector comprises a bulb connector adapted to be releasably inserted in the plurality of clips.

13. The lens assembly of claim 11 wherein:
    the at least one lens comprises a first lens and a second lens; and
    the at least one lens light source comprises a first lens light source and a second lens light source wherein
    the first lens light source is adapted to emit light through the first lens to the exterior of the light assembly; and
    the second lens light source is adapted to emit light through the second lens to the exterior of the light assembly.

14. The lens assembly of claim 13 wherein
    the first lens light source comprised a first set of at least one LED; and
    the second lens light source comprises a second set of at least one LED.

15. The lens assembly of claim 14 wherein the second set of at least one LED can emit light of different colours and the light assembly further comprises a controller to change the colour of the light emitted from the second set of at least one LED.

16. The lens assembly of claim 15 wherein the first set of at least one LED comprises
    a continuously mode wherein light is continuously emitted and
    a flashing mode wherein light is intermittently emitted and the light assembly further comprises a controller to change the first set of at least one LED from the continuously mode to the flashing mode.

17. The lens assembly of claim 11 wherein the projector comprises:
   a projector lens;
   a projector light source for emitting light through the projector lens and onto the surface under the door when the door is open; and
   an image filter through which light emitted from the projector light source partially transmits through thereby projecting the image on the surface under the vehicle door.

18. The lens assembly of claim 17 wherein the image filter is rotatable relative to the lens assembly such that the orientation of the image on the surface under the vehicle door can be changed.

19. The lens assembly of claim 17 wherein
   the lens assembly further comprises a projector recess;
   the projector further comprises a projector holder, wherein
      the projector holder is at least partially inserted within the projector recess;
      the projector lens is at least partially inserted within the projector holder,
      the projector holder and projector recess cooperate to maintain the projector lens at an orientation relative to the lens assembly; and
      the projector holder prevents interference of at least a portion of the light emitted from the at least one lens light source with the light emitted from the projector lens.

\* \* \* \* \*